(12) United States Patent
Song et al.

(10) Patent No.: US 9,313,118 B2
(45) Date of Patent: Apr. 12, 2016

(54) METHOD AND APPARATUS FOR INTERCEPTING MULTICAST PROTOCOL PACKET AND SWITCH

(71) Applicant: Huawei Technologies Co., Ltd., Shenzhen, Guangdong (CN)

(72) Inventors: Junjun Song, Nanjing (CN); Yong Chen, Nanjing (CN); Hancheng Ding, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 138 days.

(21) Appl. No.: 14/140,988

(22) Filed: Dec. 26, 2013

(65) Prior Publication Data
US 2014/0105210 A1    Apr. 17, 2014

Related U.S. Application Data

(63) Continuation of application No. PCT/CN2011/076932, filed on Jul. 7, 2011.

(51) Int. Cl.
*H04L 12/761* (2013.01)
*H04L 12/26* (2006.01)
*H04L 12/18* (2006.01)
*H04L 12/931* (2013.01)

(52) U.S. Cl.
CPC .......... *H04L 45/16* (2013.01); *H04L 12/1836* (2013.01); *H04L 43/028* (2013.01); *H04L 43/0864* (2013.01); *H04L 49/201* (2013.01)

(58) Field of Classification Search
None
See application file for complete search history.

(56) References Cited

U.S. PATENT DOCUMENTS

| 7,714,329 B2 * | 5/2010 | Suzawa .................. H01L 29/06 257/59 |
| 7,715,329 B1 * | 5/2010 | Breslau et al. ................ 370/255 |
| 2002/0120769 A1 * | 8/2002 | Ammitzboell ........ H04L 12/185 709/238 |

(Continued)

FOREIGN PATENT DOCUMENTS

| CN | 1798073 A | 7/2006 |
| CN | 101009628 A | 8/2007 |

(Continued)

OTHER PUBLICATIONS

Deering, "Host Extensions for IP Multicasting," RFC 1112, Network Working Group, Deering (Aug. 1989).

(Continued)

*Primary Examiner* — Andrew Lai
*Assistant Examiner* — Jamaal Henson
(74) *Attorney, Agent, or Firm* — Leydig, Voit & Mayer, Ltd.

(57) ABSTRACT

The present disclosure provides a method and an apparatus for intercepting a multicast protocol packet and a switch. The method for intercepting a multicast protocol packet includes: acquiring multicast work information of a router; acquiring a multicast protocol parameter of the switch according to the multicast work information of the router, where the multicast protocol parameter includes an interval of sending general query packets, a robustness variable, and a query response interval; acquiring port aging time of the switch according to the multicast protocol parameter of the switch; and aging a port if no multicast protocol packet is received on the port within the port aging time. The present disclosure further provides a corresponding apparatus and a switch including the apparatus.

16 Claims, 2 Drawing Sheets

(56) References Cited

U.S. PATENT DOCUMENTS

| | | |
|---|---|---|
| 2004/0221029 A1 | 11/2004 | Jenkins et al. |
| 2008/0123647 A1 | 5/2008 | Chen et al. |
| 2010/0014519 A1 | 1/2010 | Fernandez Gutierrez |
| 2012/0075998 A1* | 3/2012 | Shah .................... H04L 12/185 370/237 |

FOREIGN PATENT DOCUMENTS

| | | |
|---|---|---|
| CN | 101094132 A | 12/2007 |
| CN | 101304359 A | 11/2008 |
| CN | 102064956 A | 5/2011 |

OTHER PUBLICATIONS

Fenner, "Internet Group Management Protocol, Version 2," RFC 2236, Network Working Group, The Internet Society (Nov. 1997).
Cain et al., "Internet Group Management Protocol, Version 3," RFC 3376, Network Working Group, The Internet Society (Oct. 2002).
Christensen et al., "Consideration for Internet Group Management Protocol (IGMP) and Multicast Listener Discovery (MLD) Snooping Switches," RFC 4541, Network Working Group, The Internet Society (May 2006).
Wang et al., "IGMP Snooping: A VLAN-Based Multicast Protocol," pp. 345-350, IEEE, New York, New York (2002).
Cain et al., "Internet Group Management Protocol, Version 3," RFC 3376, The Internet Society (Oct. 2002).

* cited by examiner

METHOD AND APPARATUS FOR INTERCEPTING MULTICAST PROTOCOL PACKET AND SWITCH

CROSS-REFERENCE TO RELATED APPLICATIONS

This application is a continuation of International Patent Application No. PCT/CN2011/076932, filed on Jul. 7, 2011, which is hereby incorporated by reference in its entirety.

TECHNICAL FIELD

Embodiments of the present disclosure relate to the field of communications technologies, and in particular, to methods and apparatus for intercepting a multicast protocol packet and a switch.

BACKGROUND

The Internet Group Management Protocol (IGMP) is a signaling mechanism that is between a host and a router and used for an IP multicast in a user network segment, in which the multicast group member management function is implemented by exchanging an IGMP message between the host and the router.

Generally, a switch is configured between the router and the host. After a last-hop router forwards a multicast packet to the user network segment, the switch continues to perform multicast distribution. Currently, the IGMP snooping function is enabled on the switch to snoop an IGMP message exchanged between the router and a multicast group member host, so as to learn ports of the switch that are connected to the multicast group member host. Multicast packets can be distributed as required by sending only multicast data to these ports.

For example, as shown in FIG. 1, a router 1 is connected to an aggregation switch 2, the aggregation switch 2 is connected to an access switch 3, and each access switch 3 is capable of being connected to multiple multicast group member hosts. Each switch is configured with a member port for being connected to a multicast group member host side and a router port for being connected to the router side. In addition, a multicast forwarding table is configured on a switch, and each forwarding entry of the multicast forwarding table stores information about a corresponding member port. In general, if no multicast protocol packet is received on a member port within a period of waiting time, it may be considered that a corresponding multicast group member host goes offline, and the switch needs to delete a forwarding entry corresponding to the member port from the multicast forwarding table. The time of waiting for a multicast protocol packet may be called port aging time, and the port aging time may be acquired according to a multicast protocol parameter configured on the switch. In addition, for the router, when the multicast group member host goes offline, the port aging time also needs to be acquired according to a multicast protocol parameter configured on the router.

However, multicast protocol parameters on a router and a switch in the prior art are preconfigured by a manufacturer, and for different manufacturers or different product models of a same manufacturer, the multicast protocol parameters configured on the router and the switch are also generally inconsistent. Therefore, on a same network, multicast protocol parameters configured on a router and a switch may be inconsistent, and such inconsistency may result in different port aging times for all devices, which affects use of the network by a user and degrades network performance.

SUMMARY

Embodiments of the present disclosure provide methods and apparatus for intercepting a multicast protocol packet and a switch to achieve consistency between a multicast protocol parameter on each switch and that on a router and improve network performance.

An embodiment of the present disclosure provides a method for intercepting a multicast protocol packet, including:

acquiring multicast work information of a router, where the multicast work information includes an interval of receiving general query packets, the number of group-specific query packets that are received after a switch forwards a host leave packet to the router, and maximum response time set for a multicast group member host;

acquiring a multicast protocol parameter of the switch according to the multicast work information of the router, where the multicast protocol parameter includes an interval of sending general query packets, a robustness variable, and a query response interval; and acquiring a port aging time of the switch according to the multicast protocol parameter of the switch.

An embodiment of the present disclosure further provides an apparatus for intercepting a multicast protocol packet, including:

a first acquiring module, configured to acquire multicast work information of a router, where the multicast work information includes an interval of receiving general query packets, the number of group-specific query packets that are received after a switch forwards a host leave packet to the router, and maximum response time set for a multicast group member host;

a second acquiring module, configured to acquire a multicast protocol parameter of the switch according to the multicast work information of the router, where the multicast protocol parameter includes an interval of sending general query packets, a robustness variable, and a query response interval; and a third acquiring module, configured to acquire port aging time of the switch according to the multicast protocol parameter of the switch.

An embodiment of the present disclosure further provides a switch, including a system bus, a processor, a memory subsystem, and a packet processing module, where the processor is configured to implement the apparatus for intercepting a multicast protocol packet.

According to the technical solutions provided in the embodiments of the present disclosure, practical multicast work information of a router is acquired by configuring an apparatus for intercepting a multicast protocol packet in a switch, and a multicast protocol parameter is acquired according to the multicast work information, which is capable of ensuring that multicast protocol parameters configured on the switch and the router are consistent. The switch and the router work according to the consistent multicast protocol parameters, thereby achieving consistency between port aging time of the router and that of the switch and improving network performance.

BRIEF DESCRIPTION OF DRAWINGS

To describe the technical solutions in the embodiments of the present disclosure or in the prior art more clearly, the following briefly introduces the accompanying drawings required for describing the embodiments or the prior art. Apparently, the accompanying drawings in the following description show some embodiments of the present disclosure, and persons of ordinary skill in the art may still derive other drawings from these accompanying drawings without creative efforts.

DESCRIPTION OF EMBODIMENTS

To make the objectives, technical solutions, and advantages of the embodiments of the present disclosure more comprehensible, the following clearly describes the technical solutions in the embodiments of the present disclosure with reference to the accompanying drawings in the embodiments of the present disclosure. Apparently, the described embodiments are merely a part rather than all of the embodiments of the present disclosure. All other embodiments obtained by persons of ordinary skill in the art based on the embodiments of the present disclosure without creative efforts shall fall within the protection scope of the present disclosure.

Figure 1:
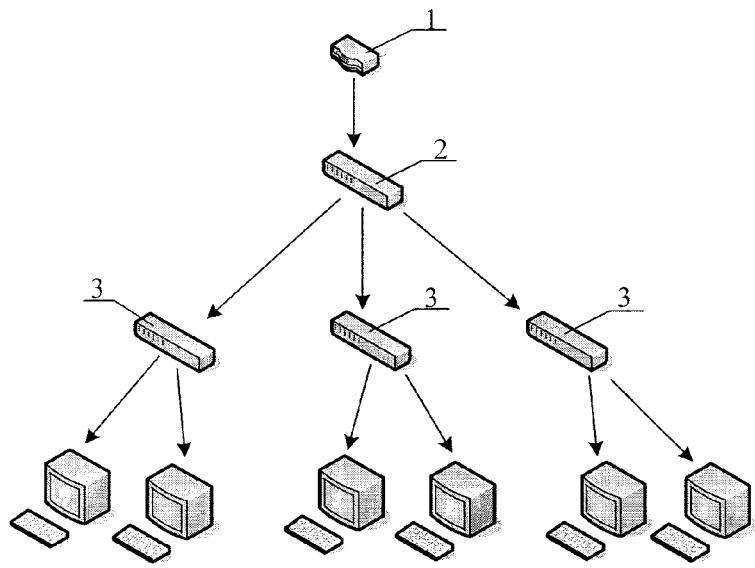
FIG. 1 is a structural diagram of a network from a last-hop router to a host in the prior art.
Figure 2:
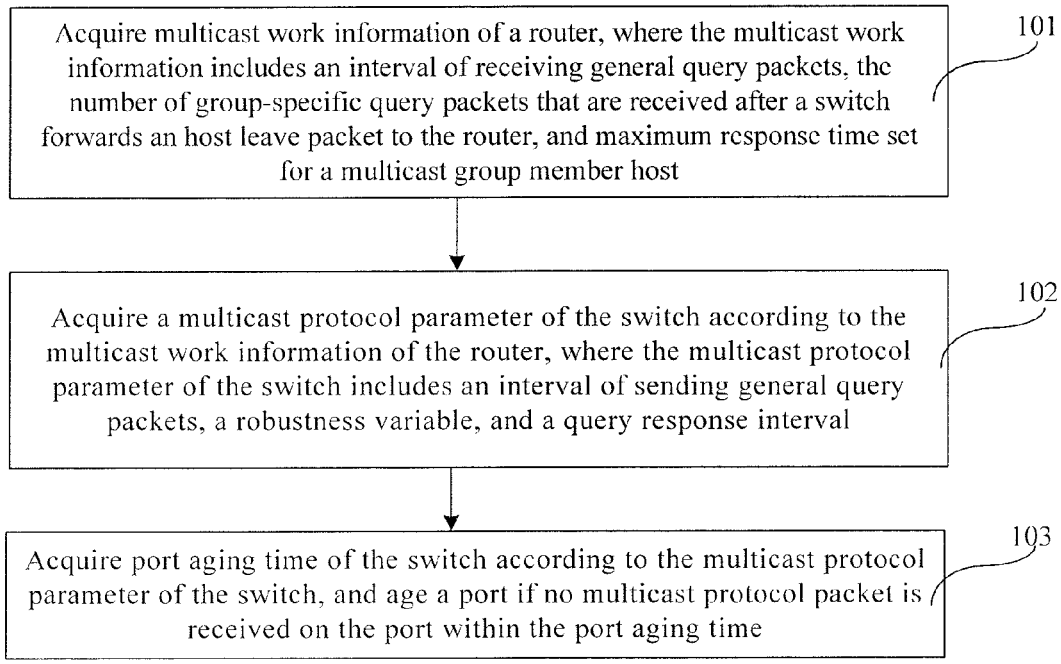
FIG. 2 is a schematic flowchart of a method for intercepting a multicast protocol packet according to an embodiment of the present disclosure.

For the problem that multicast protocol parameters configured on each switch and a router are inconsistent in an existing Layer 2 multicast communications system, an embodiment of the present disclosure provides a technical solution for intercepting a multicast protocol packet, which may allow a switch dynamically learns a multicast protocol parameter on the router. Specifically, an apparatus for intercepting a multicast protocol packet may be configured in the switch to implement the technical solution. FIG. 2 is a schematic flowchart of a method for intercepting a multicast protocol packet according to an embodiment of the present disclosure. One port of a switch may simultaneously serve multiple multicast groups. In this embodiment, one multicast group is used as an example for description. Port aging in this embodiment is described regarding one multicast group on a port, and for another multicast group, this port can still be properly used. As shown in FIG. 2, the method includes the following steps:

Step 101: Acquire multicast work information of a router, where the multicast work information includes an interval of receiving general query packets, the number of group-specific query packets that are received after a switch forwards a host leave packet to the router, and maximum response time set for a multicast group member host.

Step 102: Acquire a multicast protocol parameter of the switch according to the multicast work information of the router, where the multicast protocol parameter of the switch includes an interval of sending general query packets (Query Interval), a robustness variable (Robustness Variable), and a query response interval (Query Response Interval).

Step 103: Acquire port aging time of the switch according to the multicast protocol parameter of the switch, and age a port if no multicast protocol packet is received on the port within the port aging time.

According to the method for intercepting a multicast protocol packet provided in this embodiment of the present disclosure, the apparatus for intercepting a multicast protocol packet that is configured in a switch may acquire various multicast work information of a router in real time, for example, acquiring an interval of receiving general query packets and acquiring after the switch forwards a host leave packet to the router and maximum response time set for a multicast group member host. The multicast work information is information when the router works according to a multicast protocol parameter configured on it. After the multicast work information of the router is obtained, a multicast protocol parameter of the switch may further be acquired. The multicast protocol parameter is also the multicast protocol parameter configured on the router. The technical solution is capable of ensuring that the switch and the router work according to the consistent multicast protocol parameters, thereby ensuring consistency between port aging time of the switch and that of the router and improving network performance.

In addition, in this embodiment of the present disclosure, ports of the switch include a member port and a router port. Step 103 in the embodiment shown in FIG. 2 may specifically include:

acquiring a product of the interval of sending general query packets and the robustness variable, and using the product plus the query response interval as aging time of a first member port of the switch. Further, the product of the interval of sending general query packets and the robustness variable is acquired as aging time of the router port of the switch if the aging time of the router port needs to be configured.

In this embodiment of the present disclosure, a timer may be configured and a situation of transmitting a multicast protocol packet on each member port is monitored. If the aging time of the first member port of the switch expires but it is still monitored that no multicast protocol packet appears, it may be considered that a multicast group member host connected to the member port goes offline, and the member port can be aged. For the aging time of the router port, a timer may also be configured and a situation of receiving a multicast protocol packet on the router port of the switch is monitored. If the aging time of the router port expires but it is still monitored that no multicast protocol packet appears, the router port can be aged.

In addition, in this embodiment of the present disclosure, each multicast group member host may further go offline using a manner of actively sending a host leave (Leave) packet. After receiving a Leave packet sent by a multicast group member host, the switch forwards it to the router and the router sends a group-specific query packet to query whether there is another multicast group member host connected to the switch. The group-specific query packet is also forwarded to each multicast group member host by the switch. The router starts a timer while sending the group-specific query packet. If no response packet is received within preset time, the router ages a port connected to the switch and no longer sends a multicast protocol packet to it.

Optionally, in this embodiment of the present disclosure, the multicast work information of the router may further include an interval for the switch to receive a group-specific query packet, and the acquired multicast protocol parameter of the switch further includes an interval of sending group-specific query packets. In addition, a product of the interval of sending group-specific query packets and the robustness variable may further be acquired, and the product plus the query response interval is used as aging time of a second member port. If only one member port of the switch is connected to a multicast group member host and a Leave packet is received on the member port, the Leave packet is forwarded to the router. If no multicast protocol packet of a multicast group to which the leave packet belongs is received within the aging time of the second member port after the Leave packet is forwarded, the member port is aged.

In each embodiment of the present disclosure, after a last member port of a switch is aged, that is, after all multicast group member hosts go offline, a multicast forwarding table of a multicast group maintained on the switch can be aged.

In this embodiment of the present disclosure, a switch learns multicast work information of a router, acquires a multicast protocol parameter of the switch according to the multicast work information, and then works according to the obtained multicast protocol parameter. The work mode may be called a learning mode, which is different from a common mode, that is, the switch works according to a preconfigured multicast protocol parameter in the prior art. However, in a practical application, before the switch collects a multicast protocol parameter, the switch may firstly work in the common mode. After statistics are performed and a multicast protocol parameter that is consistent with the configuration of the router is obtained, the work mode can be dynamically converted from the common mode to the learning mode.

In this embodiment of the present disclosure, the obtained multicast protocol parameter of the switch may include an interval of sending general query packets, an interval of sending group-specific query packets, a robustness variable, and a query response interval. The following describes manners for acquiring each parameter item by item.

Specifically, the interval of sending general query packets may be acquired according to at least one obtained interval of receiving general query packets, where the general query packet is a packet for actively querying a status of a multicast group member host by the router. The packet is forwarded to the multicast group member host by the switch. The switch is capable of acquiring the interval of receiving general query packets, and estimates the interval of sending general query packets according to the interval of receiving general query packets. The interval of receiving general query packets indicates an interval between two general query packets that are received one after another. For example, any one of intervals of receiving general query packets may be used as the interval of sending general query packets. Alternatively, a maximum value, a minimum value, or a median among multiple acquired intervals of receiving general query packets may be used as the interval of sending general query packets. Alternatively, an average value of intervals of receiving general query packets may also be used as the interval of sending general query packets. For example, the apparatus for intercepting a multicast protocol packet in the switch receives a general query packet at moment T1, and then receives a next general query packet at moment T2. In this case, an interval T2-T1 of two operations of receiving general query packets is recorded and an average value of the multiple intervals is used as the interval of sending general query packets.

In addition, the interval of sending group-specific query packets may further be acquired according to at least one obtained interval between forwarding a host leave packet to the router by the switch and receiving a group-specific query packet. In this embodiment, the interval of receiving group-specific query packets indicates an interval between two group-specific query packets that are received one after another. For example, any one of intervals of receiving group-specific query packets may be used as the interval of sending group-specific query packets. Alternatively, a maximum value, a minimum value, or a median among multiple acquired intervals of receiving group-specific query packets may be used as the interval of sending group-specific query packets. Alternatively, an average value of multiple intervals of receiving group-specific query packets may also be used as the interval of sending group-specific query packets. For example, the apparatus for intercepting a multicast protocol packet in the switch receives a group-specific query packet at moment T3, and then receives a next group-specific query packet at moment T4. In this case, an interval T4-T3 of two operations of receiving group-specific query packets is recorded and an average value of the multiple intervals is used as the interval of sending group-specific query packets.

In addition, the robustness parameter may be acquired according to at least one obtained count of the number of group-specific query packets that are received after the switch forwards a host leave packet to the router. Specifically, the number of group-specific query packets that are received each time the switch forwards a host leave packet to the router may be acquired, and the number of received group-specific query packets counted at the present time is used as the robustness variable. In order to ensure higher data accuracy, statistics may be performed multiple times and a maximum value, a median, or a mode among counts of the number of group-specific query packets after the multiple times of statistics is used as the robustness variable to ensure higher data accuracy.

In addition, in this embodiment of the present disclosure, the maximum response time that is set for a multicast group member host and included in the multicast work information is maximum response time carried in a packet header of a multicast protocol packet. This method may further include acquiring the query response interval according to at least one maximum response time that is obtained from a packet header of a multicast protocol packet. Specifically, the apparatus for intercepting a multicast protocol packet in the switch may parse a packet header of a multicast protocol packet, so as to acquire maximum response time (MaxRespTime) carried in it. The maximum response time is a response time, and set by the router, for a multicast group member host after sending the multicast group member host a query packet. The switch may parse packet headers of multiple multicast protocol packets to acquire the maximum response time among. In addition, a maximum value, a minimum value, a median, or a mode among many values of maximum response time may be used as the query response interval. Alternatively, maximum response time acquired for multiple times is averaged, and the average value is used as the query response interval of the switch. The multicast protocol packet may be a Group-Specific Query packet or a General Query packet.

Figure 3:
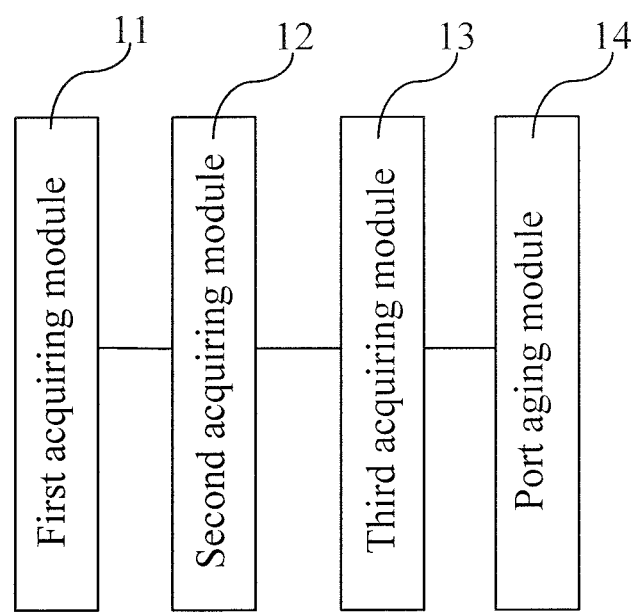
FIG. 3 is a schematic structural diagram of an apparatus for intercepting a multicast protocol packet according to an embodiment of the present disclosure.

Corresponding to the method embodiment, an embodiment of the present disclosure further provides an apparatus for intercepting a multicast protocol packet. As shown in FIG. 3, the apparatus includes a first acquiring module 11, a second acquiring module 12, a third acquiring module 13, and a port aging module. The first acquiring module 11 is configured to acquire multicast work information of a router, where the multicast work information includes an interval of receiving general query packets, the number of group-specific query packets that are received after a switch forwards a host leave packet to the router, and maximum response time set for a multicast group member host; the second acquiring module 12 is configured to acquire a multicast protocol parameter of the switch according to the multicast work information of the router, where the multicast protocol parameter includes an interval of sending general query packets, a robustness variable, and a query response interval; the third acquiring module 13 is configured to acquire port aging time of the switch according to the multicast protocol parameter of the switch; and the port aging module 14 is configured to age a port when no multicast protocol packet is received on the port within the port aging time.

The apparatus for intercepting a multicast protocol packet provided in this embodiment of the present disclosure may specifically be configured in a switch. The apparatus for intercepting a multicast protocol packet is capable of acquiring practical multicast work information of a router and acquires a multicast protocol parameter of the switch according to the multicast work information. The technical solution is capable of ensuring that a multicast protocol parameter configured on the switch is consistent with a multicast protocol parameter configured on the router, so as to enable port aging time of the router and that of the switch to be consistent and improve network performance.

In this embodiment of the present disclosure, the third acquiring module 13 may specifically be configured to acquire a product of the interval of sending general query packets and the robustness variable as aging time of a router port of the switch. The second acquiring module 12 may specifically be configured to acquire the query response interval according to maximum response time that is obtained from at least one packet header of the multicast protocol packet; or is specifically configured to acquire the interval of sending general query packets according to at least one obtained interval of receiving general query packets; or is specifically configured to acquire the robustness variable according to the at least one obtained count of the number of group-specific query packets that are received after the switch forwards a host leave packet to the router.

In addition, for a situation in which a last multicast group member host connected to the switch goes offline by sending a host leave packet, the multicast work information of the router acquired by the first acquiring module 11 further includes an interval of receiving group-specific query packets, the multicast protocol parameter of the switch acquired by the second acquiring module 12 further includes an interval of sending group-specific query packets, and the third acquiring module 13 is further configured to acquire aging time of a second member port, where the aging time of the second member port is the query response interval plus a product of the interval of sending group-specific query packets and the robustness variable; and the port aging module 14 is further configured to forward a host leave packet to the router if only one member port of the switch is connected to a multicast group member host and the host leave packet is received on the member port, and age a member port if no multicast protocol packet of a multicast group to which the host leave packet belongs is received within the aging time of the second member port after the host leave packet is forwarded.

An embodiment of the present disclosure further provides a switch, including a system bus, a processor (process unit), a memory subsystem, and a packet processing (packet process) module, where the processor is configured to implement the apparatus for intercepting a multicast protocol packet. In this embodiment of the present disclosure, the processor is capable of controlling the switch and the memory module is capable of buffering data to be sent to a router or a host.

According to the technical solutions provided in the embodiments of the present disclosure, practical multicast work information of a router is acquired by configuring an apparatus for intercepting a multicast protocol packet in a switch, and a multicast protocol parameter is acquired according to the multicast work information, which is capable of ensuring that multicast protocol parameters configured on the switch and the router are consistent. The switch and the router work according to the consistent multicast protocol parameters, thereby achieving consistency between port aging time of the router and that of the switch and improving network performance.

Persons of ordinary skill in the art should understand that all or a part of the steps in the method embodiments may be implemented by a program instructing relevant hardware. The program may be stored in a computer readable storage medium. When the program is run, the steps in the method embodiments are performed. The storage medium may be any medium that is capable of storing program codes, such as a ROM, a RAM, a magnetic disk, or an optical disk.

The foregoing descriptions are merely specific exemplary embodiments of the present disclosure, but are not intended to limit the protection scope of the present disclosure. Any variation or replacement readily figured out by persons skilled in the art within the technical scope disclosed in the present disclosure shall fall within the protection scope of the present disclosure. Therefore, the protection scope of the present disclosure shall be subject to the protection scope of the claims.

What is claimed is:

1. A method for intercepting a multicast protocol packet, comprising:
   acquiring, by a switch in a computer network, multicast work information of a router, wherein the multicast work information comprises an interval of receiving general query packets, a number of group-specific query packets that are received after the switch forwards a host leave packet to the router, and a maximum response time set for a multicast group member host;
   acquiring, by the switch, multicast protocol parameters of the switch according to the multicast work information of the router, wherein the multicast protocol parameters comprise an interval of sending general query packets, a robustness variable, and a query response interval;
   acquiring, by the switch, a port aging time of the switch according to the multicast protocol parameters of the switch; and
   aging, by the switch, a port if no multicast protocol packet is received on the port within the port aging time.

2. The method for intercepting the multicast protocol packet according to claim 1, wherein the maximum response time that is set for the multicast group member host and comprised in the multicast work information is a maximum response time included in a packet header of a multicast protocol packet, wherein the multicast protocol packet is a general query packet or a group-specific query packet, and acquiring, by the switch, the multicast protocol parameters of the switch according to the multicast work information of the router comprises:
   acquiring, by the switch, a query response interval according to a maximum response time that is obtained from at least one packet header of a multicast protocol packet.

3. The method for intercepting the multicast protocol packet according to claim 1, wherein when the multicast work information comprises the interval of receiving general query packets, and acquiring, by the switch, the multicast protocol parameters of the switch according to the multicast work information of the router comprises:
   acquiring, by the switch, the interval of sending general query packets according to at least one obtained interval of receiving general query packets.

4. The method for intercepting the multicast protocol packet according to claim 1, wherein when the multicast work information comprises the number of group-specific query packets that are received after the switch forwards a host leave packet to the router, and acquiring, by the switch, the multicast protocol parameters of the switch according to the multicast work information of the router comprises:

acquiring, by the switch, the robustness parameter according to at least one obtained count of the number of group-specific query packets that are received after the switch forwards a host leave packet to the router.

5. The method for intercepting the multicast protocol packet according to claim 1, wherein acquiring, by the switch, the port aging time of the switch according to the multicast protocol parameters of the switch comprises:

acquiring, by the switch, a product of the interval of sending general query packets and the robustness variable as an aging time of a router port of the switch.

6. The method for intercepting the multicast protocol packet according to claim 1, wherein the multicast work information of the router further comprises an interval of receiving group-specific query packets, and the multicast protocol parameters of the switch further comprise an interval of sending group-specific query packets; and aging, by the switch, the port comprises:

acquiring, by the switch, an aging time of a second member port, wherein the aging time of the second member port is the query response interval plus a product of the interval of sending group-specific query packets and the robustness variable;

forwarding, by the switch, a host leave packet to the router if only one member port of the switch is connected to a multicast group member host and the host leave packet is received on the member port; and aging, by the switch, a member port if no multicast protocol packet of a multicast group to which the host leave packet belongs is received within the aging time of the second member port after the host leave packet is forwarded.

7. The method for intercepting the multicast protocol packet according to claim 6, further comprising:

acquiring by the switch the interval of sending group-specific query packets according to the at least one obtained interval of receiving group-specific query packets after the switch forwards a host leave packet to the router.

8. The method for intercepting the multicast protocol packet according to claim 1, wherein:

the interval of sending general query packets is estimated according to an interval of receiving general query packets;

ports of the switch include a member port and a router port; and acquiring, by the switch, the port aging time of the switch comprises:

acquiring, by the switch, a product of the interval of sending general query packets and the robustness variable, and using the product plus the query response interval as aging time of the member port of the switch; and acquiring, by the switch, a product of the interval of sending general query packets and the robustness variable as aging time of the router port of the switch.

9. A switch, comprising: a processor, multiple ports, and, wherein the processor is configured to;

acquire multicast work information of a router, wherein the multicast work information comprises an interval of receiving general query packets, a number of group-specific query packets that are received after the switch forwards a host leave packet to the router, and a maximum response time set for a multicast group member host; acquire multicast protocol parameters of the switch according to the multicast work information of the router, wherein the multicast protocol parameters comprise an interval of sending general query packets, a robustness variable, and a query response interval; acquire a port aging time of the switch according to the multicast protocol parameters of the switch; and age a port of the multiple ports if no multicast protocol packet is received on port within the port aging time.

10. The switch according to claim 9, wherein the maximum response time that is set for the multicast group member host and comprised in the multicast work information is a maximum response time included in a packet header of a multicast protocol packet, wherein the multicast protocol packet is a general query packet or a group-specific query packet, and the processor is further configured to acquire a query response interval according to a maximum response time that is obtained from at least one packet header of a multicast protocol packet.

11. The switch according to claim 9, wherein the multicast work information comprises the interval of receiving general query packets, and the processor is further configured to acquire the interval of sending general query packets according to at least one obtained interval of receiving general query packets.

12. The switch according to claim 9, wherein the multicast work information comprises the number of group-specific query packets that are received after the switch forwards a host leave packet to the router, and the processor is further configured to acquire the robustness parameter according to at least one obtained count of the number of group-specific query packets that are received after the switch forwards a host leave packet to the router.

13. The switch according to claim 9, wherein the processor is further configured to acquire a product of the interval of sending general query packets and the robustness variable as an aging time of a router port of the switch.

14. The switch according to claim 9, wherein the multicast work information of the router further comprises an interval of receiving group-specific query packets, and the multicast protocol parameters of the switch further comprise an interval of sending group-specific query packets, and the processor is further configured to:

acquire an aging time of a second member port, wherein the aging time of the second member port is the query response interval plus a product of the interval of sending group-specific query packets and the robustness variable;

forward a host leave packet to the router if only one member port of the switch is connected to a multicast group member host and the host leave packet is received on the member port; and age a member port if no multicast protocol packet of a multicast group to which the host leave packet belongs is received within the aging time of the second member port after the host leave packet is forwarded by the processor.

15. The switch according to claim 9, wherein the processor is further configured to:

acquire the interval of sending group-specific query packets according to the at least one obtained interval of receiving group-specific query packets after the switch forwards a host leave packet to the router.

16. The switch according to claim 9, wherein the multiple ports include a member port and a router port, and the processor is further configured to:

estimate the interval of sending general query packets according to interval of receiving general query packets;

acquire a product of the interval of sending general query packets and the robustness variable, and use the product plus the query response interval as aging time of the member port of the switch; and acquire a product of the interval of sending general query packets and the robustness variable as aging time of the router port of the switch.

\* \* \* \* \*